INFORMATION-TRANSFER APPARATUS

Filed Jan. 19, 1968 2 Sheets-Sheet 1

ANTHONY LEONARD ISAACS
INVENTOR

BY Laurence Burns,
ATTORNEY

ANTHONY LEONARD ISAACS
INVENTOR

BY Laurence Burns,
ATTORNEY

United States Patent Office 3,508,113
Patented Apr. 21, 1970

3,508,113

INFORMATION-TRANSFER APPARATUS

Anthony Leonard Isaacs, London, England, assignor to Thorn Electronics Limited, Lane, London, England Filed Jan. 19, 1968, Ser. No. 699,207
Claims priority, application Great Britain, Feb. 10, 1967, 6,568/67
Int. Cl. H05b 37/02
U.S. Cl. 315—292 11 Claims

ABSTRACT OF THE DISCLOSURE

An information-transfer apparatus in which the information is modulated on to a carrier from whence it is recovered by demodulation and used to modulate a second carrier. In order to avoid interfering modulation of the second carrier by beats between harmonics thereof and harmonics of the first carrier the two carriers are locked in harmonic relationship with their frequencies equal to *mf* and *nf* respectively where *m* and *n* are both integers less than 10 and may be equal.

The present invention relates to information-transfer apparatus in which the information to be transferred is used to modulate a first carrier signal, which is demodulated, the information then being used to modulate a second carrier signal.

One such apparatus is, as will be explained below, the lighting control system described in connection with our copending British patent application No. 47,339/66. It is sometimes found that the brightness of lamps controlled by this system varies at a low frequency.

The present invention has sprung from the realisation that the lamp power supply, which is the second carrier signal mentioned above, carries, in addition to a lamp-brightness control signal, a beat signal derived from harmonics of the first and second carrier signals. These harmonics are separated by a small frequency difference only. The variation in lamp brightness is caused by this beat signal.

According to the present invention there is provided information-transfer apparatus comprising a first modulator for modulating a first carrier signal according to information to be transferred, a demodulator for demodulating the first carrier signal, the demodulator having its output circuit coupled to a second modulator for modulating a second carrier signal according to the output signal of the demodulator, the carrier signals having frequencies *mf* and *nf*, respectively, where *m* and *n* are integers smaller than ten, and means for locking the frequencies of the two carrier signals together to ensure that the ratio *m/n* does not change.

The integer *m* may equal the integer *n*, and both *m* and *n* may be equal to one.

In this specification and claims, the signals are said to be locked in harmonic relationship if the rate *m/n* is prevented from changing.

Relating the frequencies of the carrier signals in the ratio *m/n* ensures that, at least for low harmonics, where a harmonic of one carrier signal is near in frequency to a harmonic of the other these two harmonics will have the same frequency, but beats can still occur if the frequencies of the carriers drift causing a small difference in the frequency of those harmonics which are nominally of the same frequency. The beat signal set up would then depend on how much drift occurred, that is the frequency difference, or "slip," between the carrier signals. Locking in harmonic relationship prevents this drift, or slip.

Certain embodiments of the invention will now be described, by way of example, with reference to the accompanying drawings in which.

A lighting control system will first be described with reference to FIG. 1, and it will then be explained how this lighting control system forms apparatus according to the invention.

Figure 1:
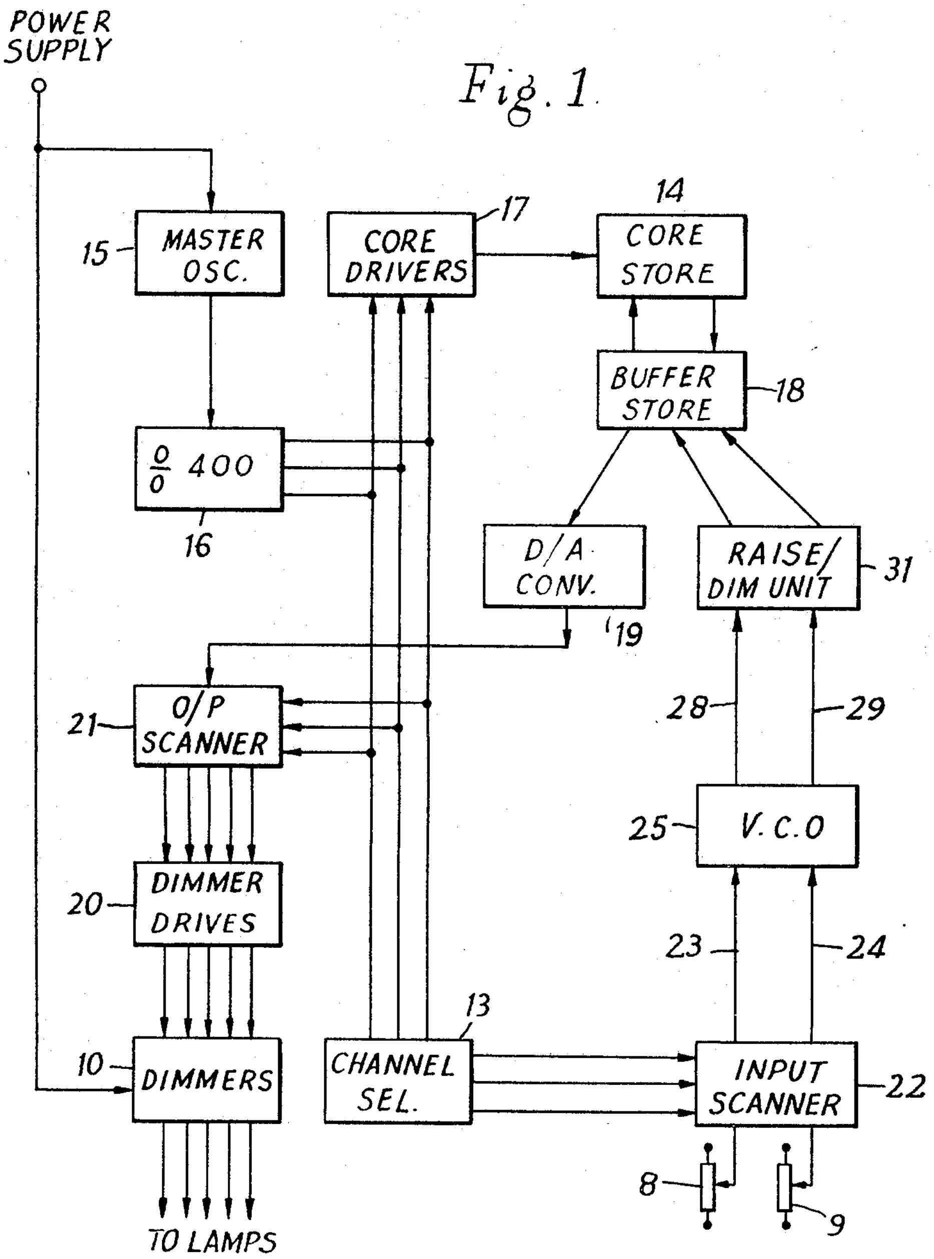
FIG. 1 is a block diagram including apparatus according to the invention.

In the stage lighting system of FIG. 1 a bank 10 of dimmers controls groups of lamps (not shown). The intensity of light from any group of lamps can be changed by moving the control lever, or dolly, of one of ten faders numbered 0 to 9, two of which 8 and 9 are shown in FIG. 1. If a dolly is moved in one direction the brightness of a group of lamps selected by a channel selector 13 is continuously increased, at a rate depending on the position of the dolly, until the lamps are at maximum intensity. Movement of the dolly in the other direction dims the lamps continuously.

Each group of lamps is allocated a channel and eight cores in a core store 14. One of the cores registers a one-bit "On Off" signal, and the other seven register a seven bit brightness count giving the required brightness for the group of lamps. The channels are time divided and for this purpose a 40 kc./s. master oscillator 15 supplies pulses to a divider circuit 16, having two cascaded divide-by-ten stages and two cascaded divide-by-two stages. The first divide-by-ten stage gives a units output, the second divide-by-ten stage gives a tens output, and the two divide-by-two stages give a four state hundreds output. The channels are numbered from one to four hundred and have a duration of twenty five microseconds. The outputs from the divider circuit are passed to core drivers 17, which at the beginning of each twenty-five microsecond channel period, using the conventional half current pulses applied to X and Y axis wires of the matrix of the store 14, select the eight cores allocated to one of the channels and transfer their contents to a buffer store 18. The contents of the buffer store is then converted to an analogue voltage by a digital to analogue converter 19. The resultant voltage is passed to a selected dimmer drive unit 20, by an output scanner 21 comprising a sampling matrix of AND gates controlled by the outputs of the divider circuit 16 and feeding four hundred reservoir capacitors. The sampling matrix, timed from the main divider waveforms, decommutates the 400-channel time sequential signal from the digital-to-analogue converter 19 into four hundred parallel signals on the four hundred reservoir capacitors. These signals, one per lighting channel, are shaped in the dimmer drive units 20 into signals controlling the four hundred dimmers, one per lighting channel.

At the end of each twenty-five microsecond period the contents of the buffer store are read back into the core store, and the contents of the next eight cores corresponding to the next channel are read into the buffer store.

The ten faders are used to enter the required brightness counts into the store 14 and to change them as necessary. First a channel is selected using the channel selector 13 and an input scanner 22. The ten faders each supply an adjustable voltage to the input scanner 22. The channel selector panel has ten "10's" buttons marked 0, 10, 20, . . . 90 and four "100's" buttons marked 0, 100, 200 and 300 respectively. There are two registers or stores in the channel selector 13, a ten-state "10's" register (states 0, 10, 20, . . . 80 and 90) and a four-state "100's" register (states 0, 100, 200 and 300). If the "200" button is depressed and released the "100's" register is set to its "200" state, lighting a signal lamp within or near the "200" button and extinguishing all other "100's" signal lamps. This condition is sustained until another "100's"

button is operated. If now the "70" button is depressed and released the "10's" register is set to its "70" state, lighting a signal lamp within or near the "70" button and extinguishing all other "10's" signal lamps. Faders 0 to 9 now operate on channels 270 to 279 respectively of the 400 channels available, controlling the lamps in lighting channels 270 to 279 respectively of the 400 channels available. If the "10's" button "0" is now depressed the "10's" register is set to its state "0," "10's" button "0" is illuminated instead of button "70" and faders 0 to 9 operate on channels 200 to 209 respectively. If "100's" button "0" is next depressed the "100's" register is set to "0," "100's" button "0" is illuminated instead of the "200' button and faders 0 to 9 operate on channels 0 to 9 respectively.

With the channel selector set to 270, the "100's" and "10's" registers in the channel selector are compared in an AND gate matrix with the corresponding counters of the divider circuit 16 to produce an output pulse when the divider circuit is in states 270 to 279.

The "units" outputs of the divider circuit 16 are applied to an "AND"-gate matrix with the analogue voltage outputs of the ten faders and with the outputs of the channel selector. With the "200" and "70" buttons illuminated, the combined output consists of samples from fader "0" output when the divider is in state "270," from fader "1" output when the main divider is in state 271, etc., and from fader "9" output when the main divider is in state 279.

The output of the input scanner 22 is composed of bursts of sequential samples of the analogue voltage inputs from the faders, each taken once per divider circuit cycle, the samples occurring only in those of the 400 available channel periods corresponding to the settings of the channel selector.

Each fader is lightly biased to its mechanical centre, and its operating lever or dolly is moved in one sense to raise the brightness of the lamps it controls and in the opposite sense to dim them. The input scanner has a two-wire output 23 and 24, the wire 23 only being energized by any faders moved from centre—zero in the "Raise" sense, the other wire 24 only being energized by any faders moved from centre zero in the "Dim" sense. The sense of fader operation is thus wire-encoded, not polarity—encoded. The samples vary in magnitude with the displacements of the fader controls from entre-zero; neither output is energized by a control set to centre-zero.

A voltage-controlled oscillator (V.C.O.) 25, uses a 128-state counter (not shown) driven by a 100 c./s. waveform from the divider 16 to produce an analogous output voltage having 128 distinct levels. Each level is sustained for one complete 400-channel cycle of the divider circuit 16, so that one complete cycle of 128 analogue voltage levels lasts 1.28 seconds.

A comparator (not shown) compares these levels with the outputs of the input scanner on wires 23 and 24. If the voltage on either output lead of the input scanner is greater than the level then existing in a given channel period, the V.C.O. produces a pulse in that channel period on the appropriate output lead. Thus with channel 273 selected and fader 3 at its centre-zero each output of the input scanner is at (or below) zero during channel period 273 of the main divider voltage levels. No pulse then occurs in channel period 273 from either of the two outputs 28 and 29 of the V.C.O. If the dolly of fader 3 is set fully in either the "Raise" or the "Dim" sense, one or other of the channel selector outputs will be greater in channel period 273 than all 128 levels of the V.C.O. counter analogue voltage, and the V.C.O. will produce a pulse at either its "Raise" output 28 or its "Dim" output 29 in channel period 273 of every complete cycle of the divider circuit 16.

When the brightness count of a group of lamps, represented by the states of the eight cores allocated to that group has been read into the buffer store 18, a raise/dim unit 31 raises or lowers the count at one unit per pulse received along wires 28 or 29. Thus if for example the fader coupled to channel 270 were in its maximum position, the count stored by the cores allocated to that channel would be increased by 128 during every cycle of the V.C.O. 128-state counter. If this fader were half way between its maximum and centre positions, the count would be increased by 64 during every cycle of this 128-state counter.

The above described lighting control system includes a multichannel information transfer network in which as in some other such systems it is advantageous for reasons of cost or space to provide some branches which are shared by many channels in the system rather than to provide a completely separate branch for each channel. In a common branch individual channel signals may be characterised by carrier frequency, i.e. in frequency-multiplex branches, or by carrier phase, i.e. in time-multiplex banches as in the system of FIG. 1.

Such time-multiplex systems comprise in general groups of elements in which information flows at high rates in relatively few parallel channels and other groups of elements in which information flows at relatively low rates in many parallel channels. A fast channel group is switched into many slow channels in turn, each slow channel including a memory or store to retain the information last received until the fast channel is again connected.

Thus in FIG. 1 the V.C.O. 25, the Raise/Dim Unit 31, the Buffer Store 18 and the Digital/Analogue Converter 19 constitutes a high-speed data-processing branch common to all channels in the system. Samples of signals from the slow-speed input channels comprising the faders 0 to 9 are conveyed in sequence to the high-speed branch by the Input Scanner 22, and samples of information held in the Core Store 14 are conveyed in sequence to the Buffer Store 18 by the operation of the Core Drivers 17. Both of these are scanning operations, the Core Store 14 comprising a large number of parallel storage channels in any one of which the information changes relatively slowly. The Output Scanner 21 constitutes means for connecting the output of the high-speed channel sequentially to each of the low-speed output channels comprising the Dimmer Drives 20 and the Dimmers 10.

In such a system we may distinguish two switching frequencies, one the channel-switching frequency 40 kc./s., at which slow channels are presented to the fast channel, and the other the field frequency 100 c./s., at which the fast channel is presented to any one slow channel.

The scanning process, carried out by the core drivers 17, is a modulation process. The scanning waveform for any slow channel comprises a fundamental field-frequency component, the carrier signal, and an array of harmonics related to this fundamental in frequency and phase. The time-sequential sampling pulses for each channel differ from channel to channel in the phases of their field-frequency components and consequently in the phases of their harmonics. The information from a given slow channel appears in the fast channel as sidebands related in frequency and phase to each component of the carrier waveform for that channel. Thus, although the signals in the fast channel appear to be related to a carrier at channel-switching frequency because the unmodulated sampling pulses appear in the fast channel at channel-switching freqeuncy, they are in fact related to the field-frequency carrier forming an array of field-frequency signals differing in carrier phase. Due to diffeing slow-channel modulations the fast-channel waveform is repetitive only at the field frequency (or fractions thereof).

The demultiplexing function performed by the Output Scanner 21 and by the Core Drivers 17 in writing information from the Buffer Store 18 into the Core Store 14 is a heterodyne demodulation process. The output switching process appears for each slow channel as the heterodyning of the total fast-channel signal by a signal consisting of a field-frequency fundamental and an array of harmonics identical or closely related in component phase and frequency to that used in scanning or sampling the corresponding slow input channel; only the information for the wanted channel correlates correctly with the heterodyning carrier array and is demodulated.

The dimmers 10 are also modulators operating with control information upon the power supply as carrier signals. Thus in controlling any group of lamps in one channel the control information is first modulated upon a field-frequency carrier, then demodulated and remodulated upon a supply-frequency carrier. The first two processes apply in any time-multiplex information transfer system, the third in any system providing a controlled supply-frequency output.

Modulation and demodulation processes can introduce signal components at unwanted frequencies. Residual ripple on power-supply output signals may introduce noise components at supply-frequency harmonics, and residual field-frequency ripple at the outputs of the demultiplexer, for example the output scanner 21, may modulate the supply-frequency carrier as supplied for example to the lamps of FIG. 1. If the field frequency and supply frequency are approximately but not exactly harmonically related beats may occur between harmonics of the two frequencies and may modulate the output, for example the lamp brightness may "hunt" slowly about the required level at a rate depending on the "slip" rate between the relevant harmonics of field and supply frequencies.

Figure 2:
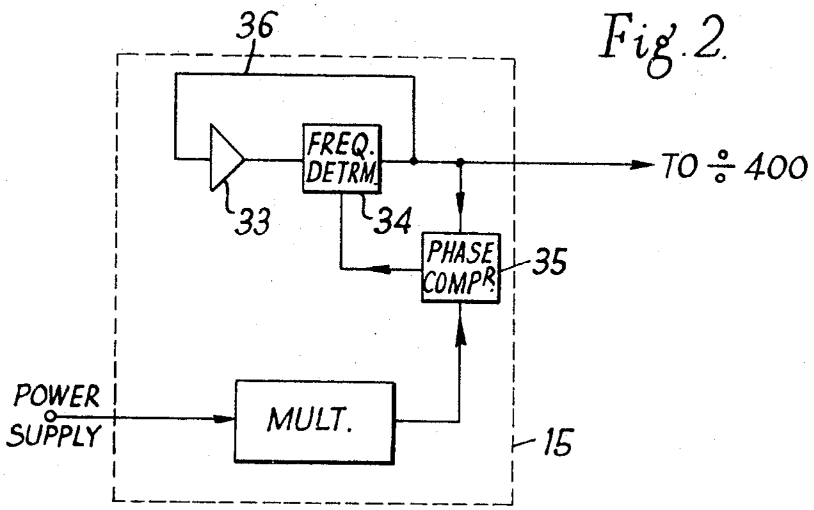
FIG. 2 is a block diagram of one form of the master oscillator of FIG. 1.

Such undesired 'beat" effects between field and supply harmonics are eliminated by locking the field frequency and supply frequency in exact harmonic relationship. For this purpose the lamp power-supply is also applied to the master oscillator, as shown in FIG. 1. Thus the Master Oscillator 15 may consist of a series of harmonic generators coupled in cascade which generate the oscillators output signal by direct frequency multiplication from the supply-frequency using harmonic generators. Instead the Master Oscillator may be synchronized to a signal derived by harmonic generation from the supply-frequency, by direct injection of the harmonic signal into the master oscillator circuit. In another arrangement the master oscillator may include an amplifier stage 33 (see FIG. 2), a voltage controlled frequency determining element 34 which may be a motor-tuned circuit a reactance transistor, or a saturable inducter, controlled by a phase comparator 35, and a feedback path 36. The phase comparator provides an error signal by comparing the oscillator's output phase with the phase of a signal generated by a multiplier circuit from the power supply signal. The error signal is then used to control the oscillator output frequency. Instead the frequency determining element 34 may be an astable multivibrator having the resistors of its timing circuits returned to a controlled bias supply.

Figure 3:
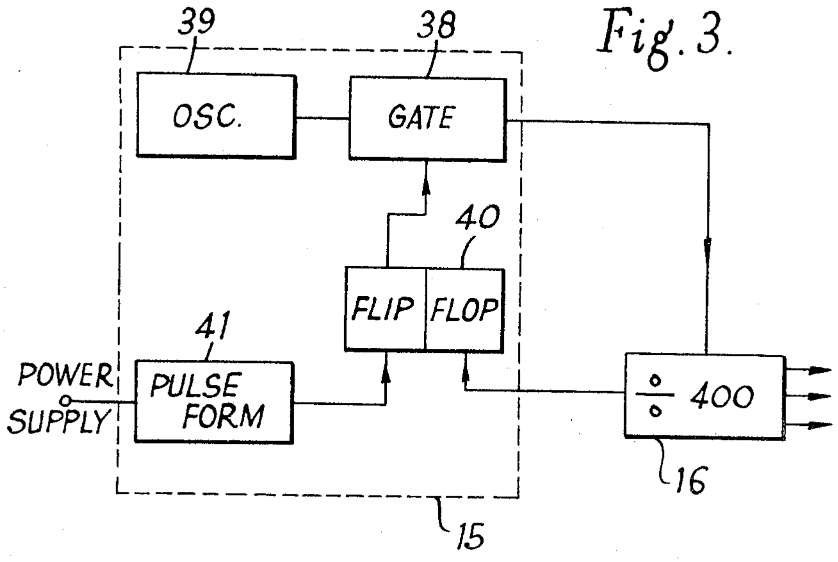
FIG. 3 is a block diagram of another form of the master oscillator of FIG. 1.

FIG. 3 shows another arrangement for the master oscillator 15, in which a gate 38 passes signals from an oscillator 39, provided it is enabled by a flip-flop circuit 40. A pulse-forming circuit 41 sets the flip-flop circuit to its enabling state once in every cycle of the power supply, but the flip-flop circuit is set to its other state every time the divider 16 reaches one particular state. An AND gate (not shown) in the divider 16 provides a pulse for the flip-flop circuit when all its inputs, coupled to one of each of the hundreds, tens and units stages, are enabled. The frequency of the oscillator 39 is then so chosen that, after the gate 38 is opened, the divider 16 cycles through all its states before the next pulse from the circuit 41 occurs. The system of FIG. 1 then switches channels at a rate dependent on the frequency of the oscillator 39, but its field frequency is determined by the supply frequency.

In some information-transfer apparatus such as portable apparatus of apparatus operating from emergency power supplies it may be easier or preferable to lock the supply frequency to the field frequency of the apparatus.

When the field frequency and supply frequency are locked in harmonic relationship the "slip" frequency becomes zero and no "hunting" occurs. For example with the field frequency as 100 c./s. and the supply frequency as 50 c./s., the second harmonic of the supply frequency, also 100 c./s., will be in constant phase relationship and beats will not be set up, as they otherwise would be if the field frequency drifted to say 101 c./s., when a beat frequency of 1 c./s. would be set up.

It may be advantageous to lock the field frequency to be an even multiple of supply frequency. Where the controlled output is at supply frequency, it can be shown that this balances a zero-frequency (D.C.) output of the system, which may arise through field frequency ripple, in successive half-cycles of the supply, producing zero resultant D.C. output. If the field frequency is an old multiple of supply frequency the zero-frequency output may not so cancel and a resultant D.C. output may occur. Such a D.C. bias on a nominally alternating supply may be undesirable, for example, where loads may be transformer coupled and the D.C. bias may interfere with correct transformer operation.

What I claim is:

1. Information-transfer apparatus comprising a first modulator for modulating a first carrier signal according to information to be transferred, demodulator for demodulating the first carrier signal, a second modulator, means coupling the output of said demodulator to said second modulator for modulating a second carrier signal according to the output signal of the demodulator, said first and second carrier signals having frequencies $mf$ and $nf$, respectively, where $m$ and $n$ are integers smaller than ten, and means for locking the frequencies of the two carrier signals together to ensure that the ratio $m/n$ does not change.

2. Apparatus according to claim 1 including a time-multiplex system comprising a plurality of input channels, an equal number of corresponding output channels, and a common channel through which information from the input channels reaches the output channels, said first modulator being coupled between the input channels and the common channel, and so modulating the first carrier signal that items of information are passed sequentially along the common channel, and said demodulator being coupled between the common channel and the output channels, and so demodulating the first carrier signal that each item of information is passed to that output channel which corresponds to the input channel from which that item originated.

3. Apparatus according to claim 1, wherein the second carrier signal is the power supply for a lamp, the output signal of the demodulator comprises a control signal for controlling the brightness of the lamp, and the second modulator includes a dimmer-drive circuit and a dimmer, which together modulate the amplitude of the power supply in accordance with the control signal.

4. Apparatus according to claim 2, wherein the second carrier signal is the power supply for a lamp, the output signal of the demodulator comprises a control signal for controlling the brightness of the lamp, and the second modulator includes a dimmer-drive circuit and a dimmer, which together modulate the amplitude of the power supply in accordance with the control signal.

5. Apparatus according to claim 4, wherein a number of the input and output channels contain information as to the desired brightness of an equal number of corresponding lamps.

6. Apparatus according to claim 5, further comprising a core-store coupled to said common channel and wherein said first modulator includes core-driver means for sequentially reading out the contents of said core-store into the common channel.

7. Apparatus according to claim 6 including means for changing the brightness of selected lamps and means for selectively changing the contents read-out from said core-store before demodulation, in dependence on the output of said brightness-changing means.

8. Apparatus according to claim 1, wherein the means for locking the two carrier signals together includes harmonic-generator means for generating one carrier signal from the other.

9. Apparatus according to claim 1, including an oscillator, for generating one of the carrier signals, having control means for controlling the frequency of the carrier signal so generated, and wherein the means for locking the two carrier signals together includes a phase comparator, for comparing the phases of the first or second carrier signal to provide an error signal which, when applied to the said control means, causes the control means to reduce to zero any difference between the frequencies compared.

10. Apparatus according to claim 1 including an oscillator for generating one of said carrier signals, wherein the means for locking the two carrier signals together includes inhibiting means having two states, in one of which the oscillator signal is prevented from reaching one of the modulators and in the other of which the oscillator signal is allowed to reach one of the modulators, a divider circuit coupled to the output of the inhibiting means and having a number of states equal to the divisor of the division carried out, means for changing the state of the inhibiting means to its said one state every time the divider circuit reaches a predetermined one of its states, and means for changing the state of the inhibiting means to its said other state once every cycle of the carrier signal which is not generated by the said oscillator, the divider cycling through all its states every time the inhibiting means is in its said other state.

11. Apparatus according to claim 1 wherein the frequency of one carrier signal is an even multiple of the frequency of the other carrier signal.

References Cited

UNITED STATES PATENTS

| | | | |
|---|---|---|---|
| 2,994,804 | 8/1961 | Skirpan | 315—297 X |
| 3,004,193 | 10/1961 | Bentham et al. | 315—316 X |
| 3,221,214 | 11/1965 | Wolff et al. | 315—292 |
| 3,358,237 | 12/1967 | Houle | 307—218 X |

JOHN W. HUCKERT, Primary Examiner

R. F. POLISSACK, Assistant Examiner

U.S. Cl. X.R.

315—294, 197, 299, 316, 317, 318, 319